United States Patent [19]
Yuan

[11] Patent Number: 5,367,385
[45] Date of Patent: Nov. 22, 1994

[54] METHOD AND APPARATUS FOR PROCESSING BLOCK CODED IMAGE DATA TO REDUCE BOUNDARY ARTIFACTS BETWEEN ADJACENT IMAGE BLOCKS

[75] Inventor: Xiancheng Yuan, Boston, Mass.

[73] Assignee: PictureTel Corporation, Danvers, Mass.

[21] Appl. No.: 866,031

[22] Filed: May 7, 1992

[51] Int. Cl.⁵ .......................................... H04N 1/415
[52] U.S. Cl. .................................. 358/465; 358/432; 348/420
[58] Field of Search .................... 382/56, 48; 358/136, 358/13, 133, 135, 105, 138, 430–450; 395/165; 364/135

[56] References Cited

U.S. PATENT DOCUMENTS

| | | | |
|---|---|---|---|
| 4,754,492 | 1/1988 | Malvar | 382/41 |
| 4,894,713 | 1/1990 | Delogne et al. | 358/133 |
| 5,006,930 | 4/1991 | Stroppiana et al. | 358/133 |
| 5,021,891 | 6/1991 | Lee | 358/432 |
| 5,063,608 | 11/1991 | Siegel | 358/133 |
| 5,065,446 | 11/1991 | Suzuki et al. | 382/56 |
| 5,107,345 | 4/1992 | Lee | 358/133 |
| 5,107,346 | 4/1992 | Bowers et al. | 358/447 |
| 5,113,255 | 5/1992 | Nagata et al. | 358/133 |
| 5,113,457 | 5/1992 | Enomoto et al. | 382/56 |
| 5,134,475 | 7/1992 | Johnston et al. | 358/133 |
| 5,134,477 | 7/1992 | Knauer et al. | 358/136 |
| 5,150,208 | 9/1992 | Otaka et al. | 358/133 |
| 5,177,796 | 1/1993 | Feig et al. | 382/56 |
| 5,177,797 | 1/1993 | Takenaka et al. | 382/56 |
| 5,189,526 | 2/1993 | Sasson | 358/133 |
| 5,193,003 | 3/1993 | Kondo | 358/133 |
| 5,193,004 | 3/1993 | Wang et al. | 358/133 |
| 5,196,930 | 3/1993 | Kadono et al. | 358/133 |
| 5,196,933 | 3/1993 | Henot | 358/133 |
| 5,214,502 | 5/1993 | Stone et al. | 358/133 |
| 5,216,712 | 6/1993 | Shimada et al. | 358/133 |
| 5,231,487 | 7/1993 | Hurley et al. | 358/133 |

OTHER PUBLICATIONS

Wallace, "The JPEG Still Picture Compression Standard", pp. 1–8, Dec. 1991.

Randall et al., "Standards for Video Codec" by Delta Information System Inc.

Ramamurthi et al., "Nonlinear Space-Variant Post-processing of Block Coded Images", *IEEE Transactions on Acoustics, Speech, and Signal Processing*, vol. AS-SP-34, No. 5, Oct., 1966, pp. 1258–1267.

*Primary Examiner*—Paul Ip
*Attorney, Agent, or Firm*—Fish & Richardson

[57] ABSTRACT

A method and apparatus for processing block coded image data wherein each block comprises a plurality of pixels. A local pixel is selected from a first block of pixels. The selected pixel is preferably near a border between the first block of pixels and a second block of pixels. At least one external pixel is selected from the second block of pixels. The selected external pixel(s) is (are) also near the border. The selected local pixel is modified to reduce the difference between the local pixel and the selected external pixel(s). The selected pixel value is modified as follows. A low pass filter coefficient is selected for each selected local pixel value and for each selected external pixel value. The selected local pixel value and the external pixel values are each multiplied by their corresponding low pass filter coefficient. The products of these multiplications are summed together to form a low pass filtered pixel value.

7 Claims, 11 Drawing Sheets

METHOD AND APPARATUS FOR PROCESSING BLOCK CODED IMAGE DATA TO REDUCE BOUNDARY ARTIFACTS BETWEEN ADJACENT IMAGE BLOCKS

BACKGROUND OF THE INVENTION

The invention relates to processing block coded image data. The Consultative Committee for International Telephony and Telegraph (CCITT) has adopted a standard (H.261) for encoding image data representative of a sequence of two dimensional arrays of image data. According to the proposed standard, a two dimensional array of pixel data is divided into a plurality of blocks, each block including an 8×8 sub-array. Each block of data is encoded using a lossy encoding technique to reduce the number of bits required to represent the block. The encoded data is then transmitted to a remote device which reconstructs the entire image from the transmitted data.

The image reconstructed from the encoded blocks does not perfectly correspond to the original image. In each block of data, image information is lost when the data is compressed to reduce the number of bits for transmission. Since each block is separately coded, the losses in one block differ from those of adjacent blocks. As a result, a noticeable line appears at the boundaries between the blocks.

One object of the invention is to process the pixels near the boundaries between adjacent blocks to reduce or eliminate the noticeable boundary caused by block encoding. Another object of the invention is to efficiently examine the pixel data near the borders between blocks to determine if the image includes edges in the vicinity of the border. If such edges are detected, the pixels near the border are processed to reduce the coding artifacts caused by block encoding without removing or distorting edges which appear in the image.

SUMMARY OF THE INVENTION

The invention relates generally to a method and apparatus for processing block coded image data wherein each block comprises a plurality of pixels. A local pixel is selected from a first block of pixels. The selected pixel is preferably near a border between the first block of pixels and a second block of pixels. At least one external pixel is selected from the second block of pixels. The selected external pixel(s) is (are) also near the border. The selected local pixel is modified to reduce the difference between the local pixel and the selected external pixel(s).

In preferred embodiments, the selected pixel value is modified as follows. A low pass filter coefficient is selected for each selected local pixel value and for each selected external pixel value. The selected local pixel value and the external pixel values are each multiplied by their corresponding low pass filter coefficient. The products of these multiplications are summed together to form a low pass filtered pixel value.

Similarly, an all pass filter coefficient is selected for each selected local pixel value and for each external pixel value. The selected local pixel value and the external pixel values are each multiplied by their corresponding selected all pass filter coefficient. The products of these multiplications are summed together to form an all pass filtered pixel value. The all pass filtered pixel value and the low pass filtered pixel value are combined to form a smoothed pixel value.

The above described processing is performed on block encoded data. To appreciate further aspects of the invention, it must be noted that the block encoded data is derived from an original block of image data which is quantized to reduce the number of bits required to represent the original block of image data. In another aspect of the invention, the magnitude of this quantization step size is used in processing the blockcoded image data. More specifically, to combine the filtered pixel values, a proportionality factor is first selected based on the quantization step size. A weighted sum of the all pass filtered pixel value and the low pass filtered pixel value is then computed to form a smoothed pixel value, wherein the proportionality factor specifies the relative weight accorded to each filtered pixel value.

In another aspect, the invention relates to detecting the approximate direction of edges, if any, in the vicinity of the border. Based on the detected direction of any such edges, the external pixels are selected such that they form a line with the local pixel which extends in the detected direction.

To detect the approximate direction of such edges, a first gradient value is computed which represents the average difference between at least one pair of local border pixels (i.e., in the vicinity of the border) which form a line in a first direction.

A second gradient value is computed which represents the average difference between at least two local border pixels which form a line in a second direction. The smaller of the two gradients are selected. The direction in which the smaller gradient was computed is chosen as the approximately direction.

In preferred embodiments, the first direction forms approximately a forty-five degree angle with the border, and the second direction forms approximately a one hundred and thirty-five degree angle with the border. In such embodiments, a third gradient value is computed which represents the average difference between a plurality of local border pixels which form a line at approximately a ninety degree angle with the border.

A bias factor is subtracted from the third gradient value to form a biased gradient value. The smallest of the first, second, and biased gradients is selected. The direction of the smallest gradient is chosen as the approximate direction for smoothing. However, if the first and second gradients are equal, the biased gradient is selected and the direction of the biased gradient is chosen as the direction for smoothing.

Other objects, features and advantages of the invention are apparent from the following description of particular preferred embodiments taken together with the drawings.

DESCRIPTION OF THE PREFERRED EMBODIMENTS

I. System Overview

Figure 1A:
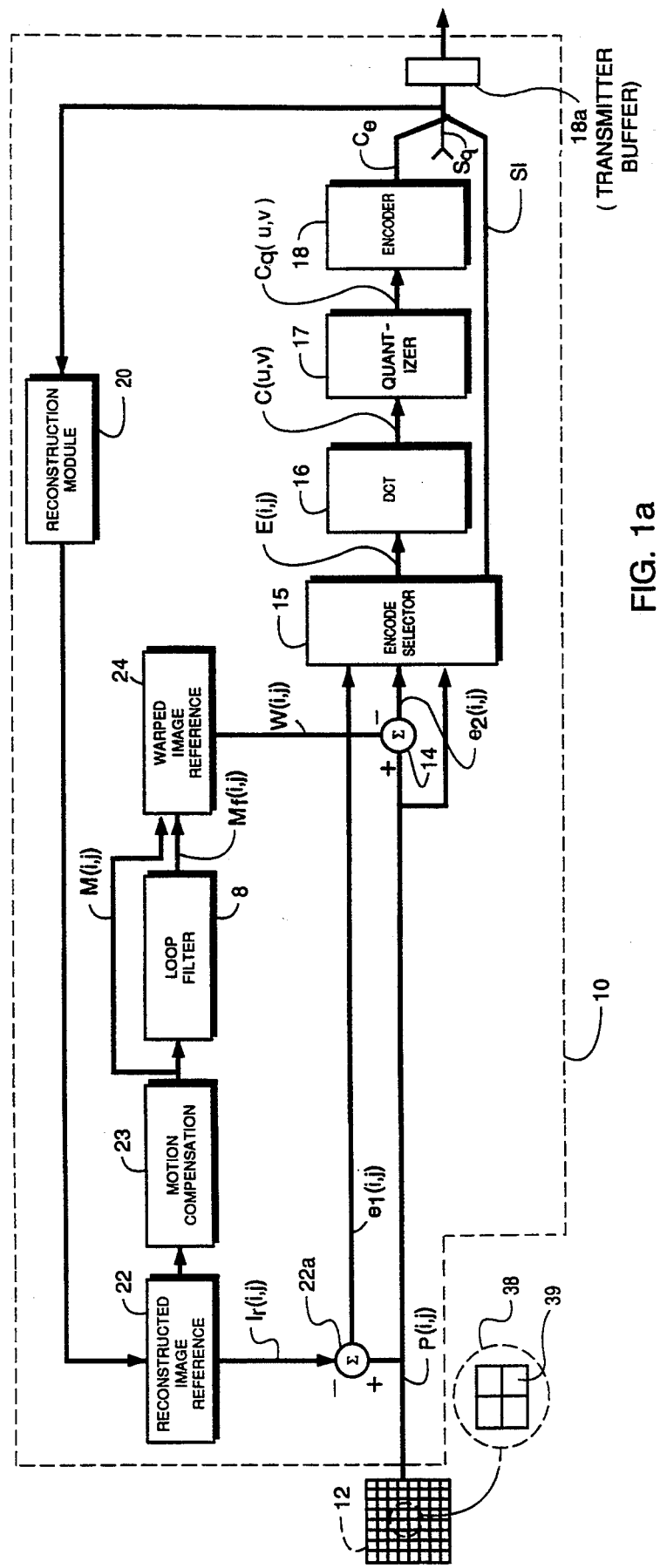
FIG. 1(a) is a block diagram of a transmitter for encoding image data using a block encoder.
Figure 1B:
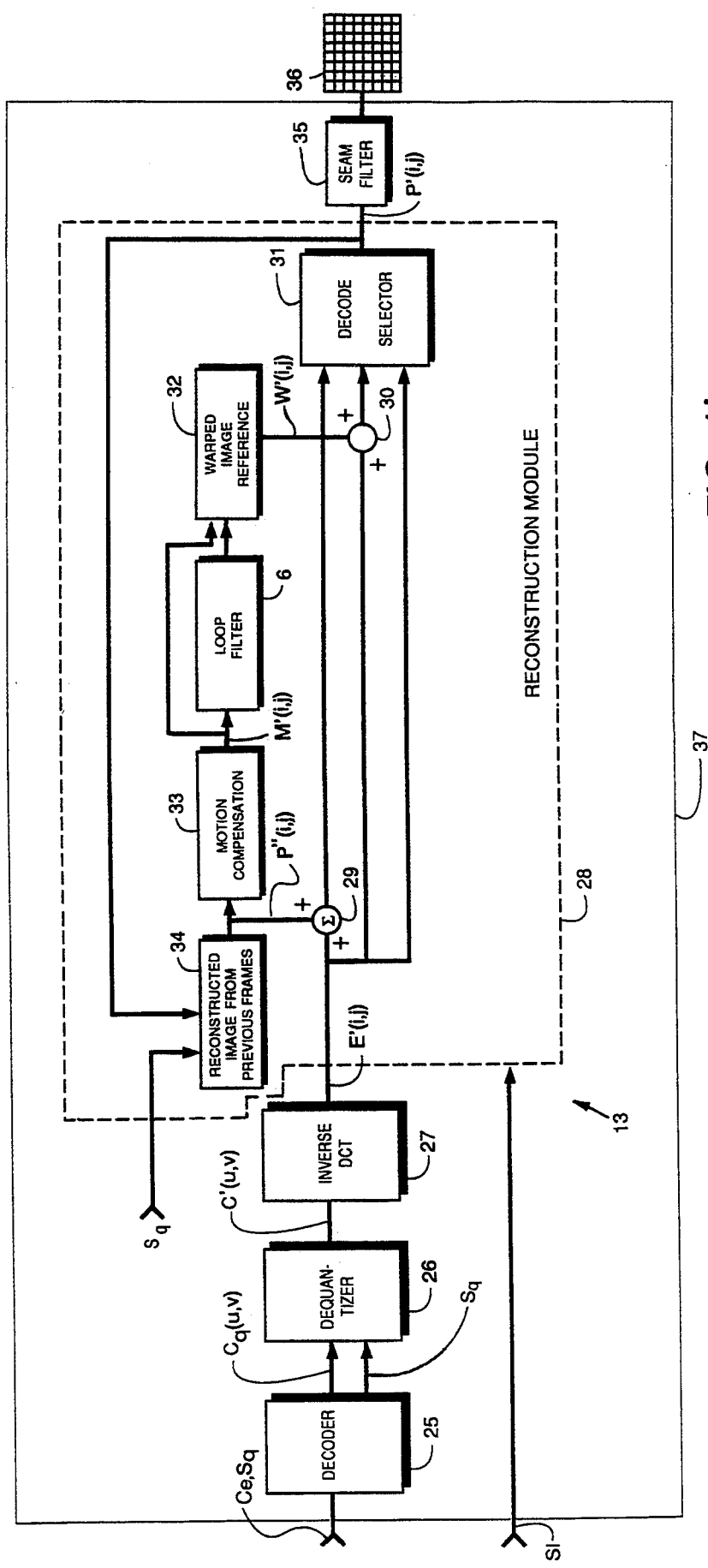
FIG. 1(b) is a block diagram of a receiver for decoding image data received from the transmitter to reproduce the image.

Referring to FIGS. 1(a) and 1(b), a transmitter 10 encodes image data representative of an image 12 and transmits the encoded image data to a receiver 37 which reconstructs the image and displays it at a remote location. Image 12 consists of luminance and chroma components. However, for purposes of the following discussion, only the luminance components is described.

The transmitter 10 separates the image into an array of macroblocks 38 wherein each macroblock includes a 16×16 sub-array of pixel data. Each macroblock is further divided into four blocks 39 each including an 8×8 sub-array of pixel data.

The transmitter is typically capable of encoding each block of data using a variety of encoding techniques. For each macroblock of data, the transmitter selects an encoding technique which requires the fewest number of bits to describe the macroblock of data.

One class of such techniques is referred to as "interframe" encoding. Interframe encoding techniques define each block of image data in terms of the differences between the block of data and a reference block of data. The transmitter transmits the difference information to the receiver. Since the receiver maintains copies of the references images, it can reconstruct the block of data by combining the difference information with the reference image.

Another technique is referred to as "intraframe" encoding. According to this technique, the transmitter simply transmits the original block of data to the receiver. In effect, intraframe encoding describes each block of data in terms of the differences between the block of data and a zeroed reference block in which each pixel equals zero.

Finally, the transmitter may send no information regarding the block of data. This implies to the receiver that the corresponding block for the last frame should be used as the block for the current frame.

One interframe encoding technique uses the most recently transmitted frame as a reference. As shown in FIG. 1(a), the transmitter includes a reconstruction module 20 which reconstructs each frame of the sequence of images from the transmitter's own transmission signal T in a manner similar to the reconstruction performed at the receiver. The transmitter stores the reconstructed image in a reconstructed frame reference memory 22.

For each block of pixel data P(i,j), a subtractor 13 calculates the difference between each pixel P(i,j) of the block and a corresponding pixel $I_r$(i,j) in the reconstructed frame. The resultant error signal $e_r$(i,j) is provided to an encode selector 15 for determining whether $e_r$(i,j) is a more efficient representation of the block of data than the other encoded representations described below.

Another interframe encoding technique prepares, for each block to be transmitted, a warped image reference. Toward this end, a motion compensation module 23 searches for an 8×8 block of data M(i,j) in the reconstructed image 22 which closely matches the block to be coded. A loop filter 8 typically filters the selected block. However, the filtered output $M_f$(i,j) is only used if it more closely matches the pixel data P(i,j) than the unfiltered version M(i,j). The selected block of data (M(i,j) or $M_f$(i,j)) is stored in a warped image reference memory 24 for use as a reference W(i,j) in encoding the block.

A second subtractor 14 subtracts each pixel P(i,j) of the block to be coded from the corresponding pixel w(i,j) of the warped block. The resultant error signal $e_2$(i,j) therefore represents the block in terms of the difference between the original block and the warped reference block. Since the receiver can prepare the same warped reference block, it can reconstruct the original block by combining the error signal $e_2$(i,j) and the warped reference w(i,j). The error signal $e_2$(i,j) is supplied to the encode selector for comparison with the other encoded representations of the block.

Other interframe encoding techniques are well known to those skilled in the art. However, the above techniques are used as examples to illustrate the operation of the invention.

Finally, for purposes of intraframe encoding, the original pixel data P(i,j) for the block is supplied to the encode selector. For each macroblock, the encode selector determines whether to a) transmit the blocks within the macroblock as represented by one of the above described forms of encoding, or b) send no information regarding the block thereby instructing the receiver to repeat the same block from the previous frame. For purposes of describing the further processing of each block, the error signal selected by the encode selector is referred to as pixel error data E(i,j).

Figure 2:
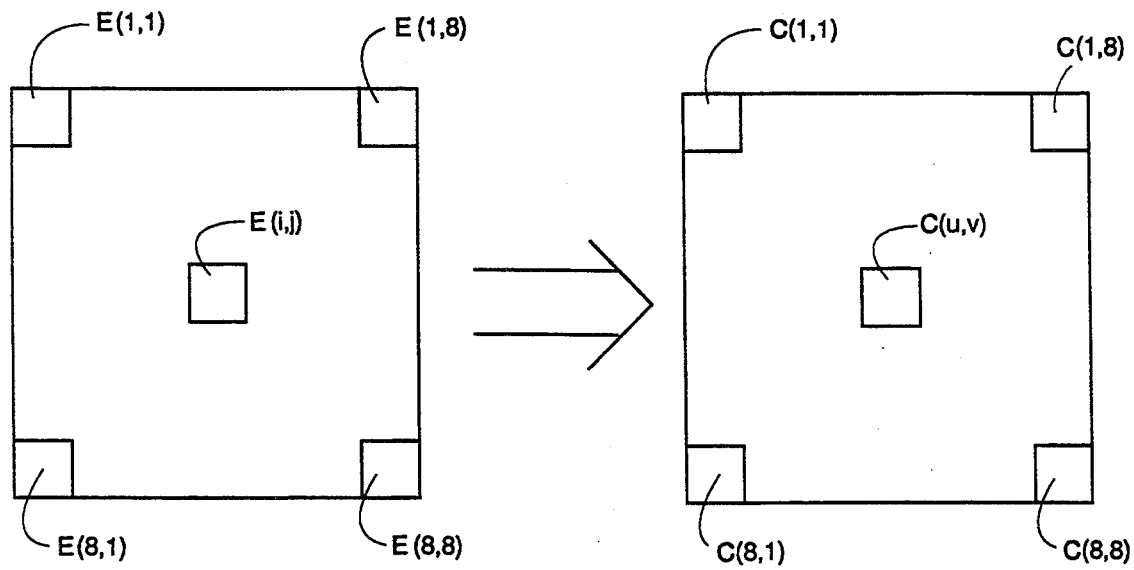
FIG. 2 is a diagram illustrating the operation of a discrete cosine transform.

Each selected 8×8 block of pixel error data E(i,j) is supplied to a two dimensional discrete cosine transform module (DCT) 16 which converts the 8×8 array of pixel error data E(i,j)into an 8×8 array of transform coefficients C(u,v). (See FIG. 2) As is known to those well skilled in the art, the DCT transform is related to the Discrete Fourier Transform (DFT). Accordingly, the two dimensional array of discrete transform coefficients C(u,v) represents the two dimensional "spatial frequencies" within the block of pixel error data. The discrete cosine transform coefficient C(1,1) in the upper left hand corner of the coefficient array represents the DC component of the array of pixel error data. The remaining coefficients are referred to as the "AC coefficients". Each AC coefficient represents a spacial frequency component of the block of pixel error data.

The array of DCT coefficients is supplied to a quantizer 17 which quantizes each coefficient by dividing the coefficient by a selected quantization step size. The quotient is rounded to the nearest integer to form a quantized coefficient $C_q$(u,v). Accordingly, the quantized coefficients represent the array of DCT coefficients using fewer bits than the original DCT coefficients. The magnitude of step sizes used to quantize the coefficients is therefore chosen to control the number of bits required to represent the array. Preferably, the step size is chosen such that the quantized coefficients represent the original coefficients as accurately as possible using the number of bits allocated for transmission of the image data.

Each quantized coefficient $C_q(u,v)$ is supplied to an encoder 18 which further encodes the quantized coefficients and transmits the encoded coefficients $C_e$ and the selected quantization step size $S_q$ to the receiver 37.

Referring to FIG. 1(b), the receiver includes a decoder 25 which decodes the coefficients $C_e$ to reproduce the quantized coefficients $C_q(u,v)$. Because the encoder 18 and decoder 25 are lossless, the quantized coefficients $C_q(u,v)$ reproduced by the decoder 25 are identical to those generated by the transmitter's quantizer 17, in the absence of transmission error.

An inverse quantizer 26 multiplies each quantized coefficient $C_q(u,v)$ by the received step size $S_q$ to produce the received coefficients $C'(u,v)$. The received coefficients differ from the original coefficients $C(u,v)$ due to the rounding operation performed by the transmitter. The error introduced by this rounding operation is referred to as the "quantization error".

The received coefficients $C'(u,v)$ are supplied to an inverse DCT module 28 which converts the received coefficients back to an 8×8 array of pixel error data $E'(i,j)$. A reconstruction module 28 reconstructs the pixel data $P'(i,j)$ data from the pixel error data $E'(i,j)$.

More specifically, if intraframe encoding was used, a decode selector 31 treats the pixel error signal $E'(i,j)$ as the reconstructed pixel data $P'(i,j)$ without further processing. If interframe encoding was employed, the reconstruction module combines the error signals $E'(i,j)$ with the appropriate reference image data to reconstruct the pixel data. For example, if the previous reconstructed frame was used as a reference, an adder 29 combines the pixel error data $E'(i,j)$ with the reconstructed image data $P''(i,j)$ from the previous frame 34 to form the reconstructed pixel data $P'(i,j)$ for the current frame. If the warped reference was used, a motion compensation module 33 prepares a motion compensated block $M'(i,j)$. If the motion compensated block was filtered at the transmitter, (as indicated by side information sent by the transmitter) a loop filter 6 filters the motion compensated block $M'(i,j)$ and stores the result as a warped reference $W'(i,j)$ in a warped reference store 32. A second adder 30 combines the received error signal $E'(i,j)$ with the warped reference $W'(i,j)$ to form the reconstructed pixel data $P'(i,j)$.

The reconstructed pixel data $P'(i,j)$ is supplied to a reconstructed image store 34 for storing the reconstructed image. The reconstructed image store also stores, for each stored block, the quantization step size used to encode the stored block.

Since the transmitted DCT coefficients differ from the original coefficients by a quantization error, the block of reconstructed pixel data $P'(i,j)$ prepared from the transmitted coefficients differs from the original block of pixel data $P(i,j)$. For purposes of the following discussion, the difference between a given reconstructed pixel $P'(i,j)$ and the corresponding original pixel $P(i,j)$ is referred to a "pixel quantization error."

Figure 3:
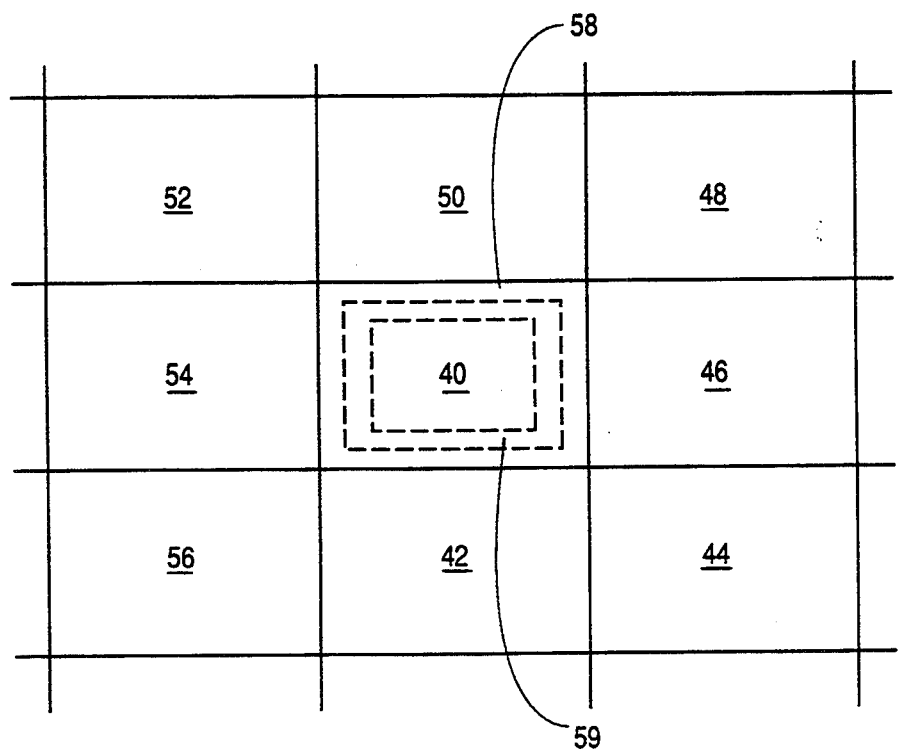
FIG. 3 is a diagram illustrating the boundaries between the adjacent blocks of image data.

Referring to FIG. 3, the pixel quantization errors in a given block 40 may differ from the pixel quantization errors in each of the neighboring blocks 42–56 thereby causing noticeable boundaries between the adjacent blocks. Several factors contribute to the difference in pixel quantization errors. First, the quantization is performed on DCT coefficients which represent the spacial frequency components of the block of pixel error data. Accordingly, even if two adjacent blocks use the exact same quantization step size $S_q$, the resultant pixel quantization errors in one block are not necessarily the same as those in an adjacent block. Further, each block may have a different quantization step size. Coefficients which are coarsely quantized are likely to have correspondingly large pixel quantization errors. Thus, if a first block is coarsely quantized and its neighboring block is finely quantized, the pixels on either side of the border between the blocks will likely have dramatically different pixel quantization errors.

Figure 4:
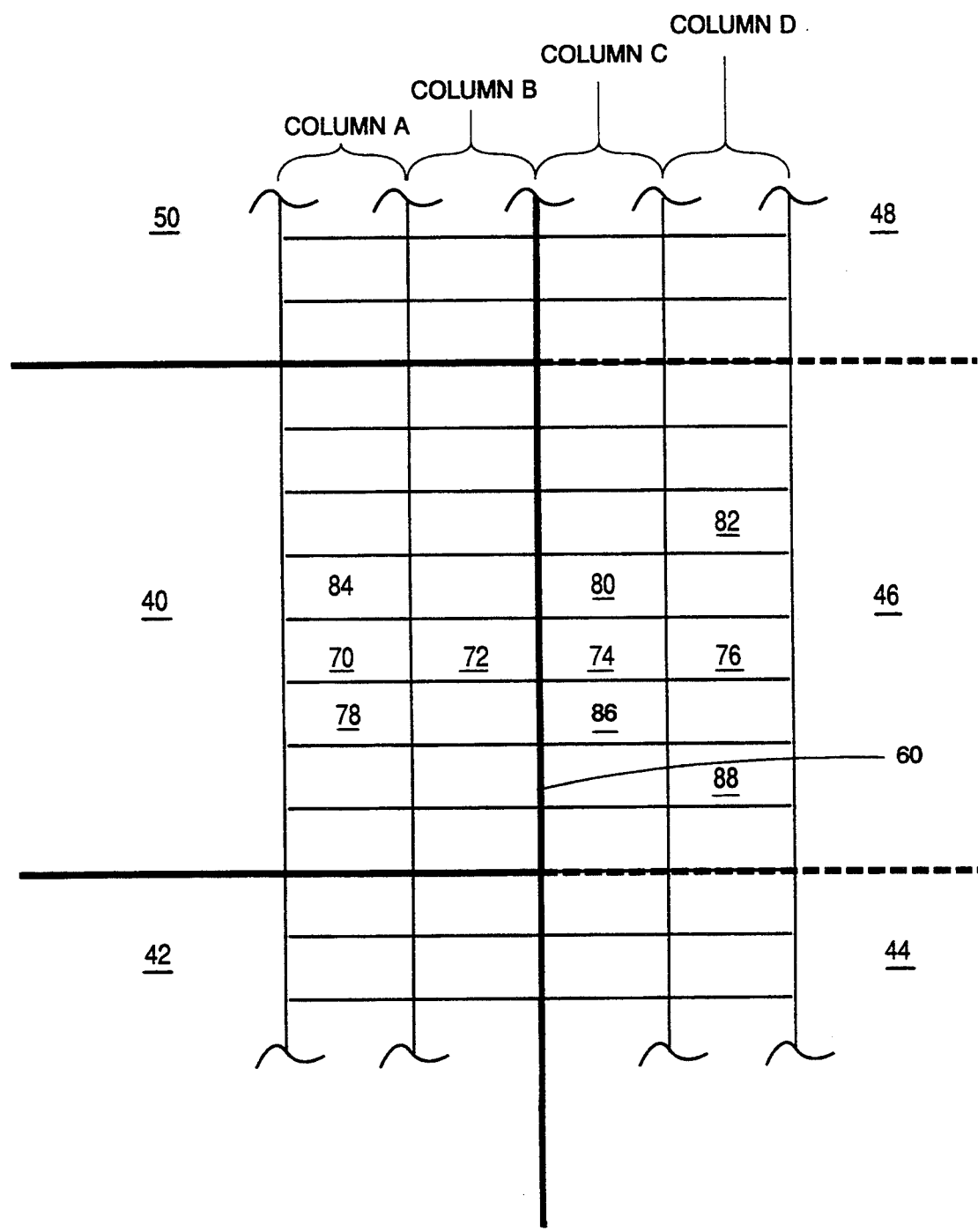
FIG. 4 is a block diagram illustrating four columns of pixels surrounding a border between adjacent blocks.

Referring again to FIG. 1(b), the receiver includes a seam filter 35 for processing the reconstructed pixel data $P'(i,j)$ to reduce the noticeable boundaries caused by block encoding. The seam filter 35 processes each pixel along the borders of each block ("border pixels") to reduce the disparity between the border pixels and neighboring pixels within adjacent blocks. As shown in FIG. 3, the border pixels consist of outer boundary pixels 58 which directly border the adjacent blocks 42–56, and inner boundary pixels 59 adjacent to the outer boundary pixels 58. To illustrate the operation of seam filter 30, the following describes the smoothing of an outer boundary pixel 72 near a border 60 between blocks 40 and 46 (FIG. 4).

The pixels within the image 12 are arranged in columns. As shown in FIG. 4, to smooth pixel 72, filter 30 selects a pixel from column A to the left of pixel 72, and a pixel from each of the two columns C, D to the right of pixel 72 (e.g., from adjacent block 46). As explained more fully below, the filter replaces pixel 72 with a smoothed pixel value derived from the values of pixel 72 and the three selected pixels.

To select pixels from each of the neighboring columns, the filter first determines a direction in which smoothing is to be performed. For example, to smooth in a direction perpendicular to border 60, the filter selects pixels 70, 74, 76 which form a line perpendicular to the border. To smooth at a 45° angle, the filter selects pixels 78, 80, 82 which together with pixel 72 form a line at a 45° angle to the border. Similarly, to filter at a 135° angle, the filter selects pixels 84, 86, 88 which together with pixel 72 form a line at a 135° angle to the border.

As explained more fully below, the direction of smoothing is determined by an edge detector which examines the received pixels to locate lines or edges in the image. For example, if the edge detector locates a line or edge at approximately a 45° angle to the border, it selects 45° as the desired angle for smoothing.

Figure 5:
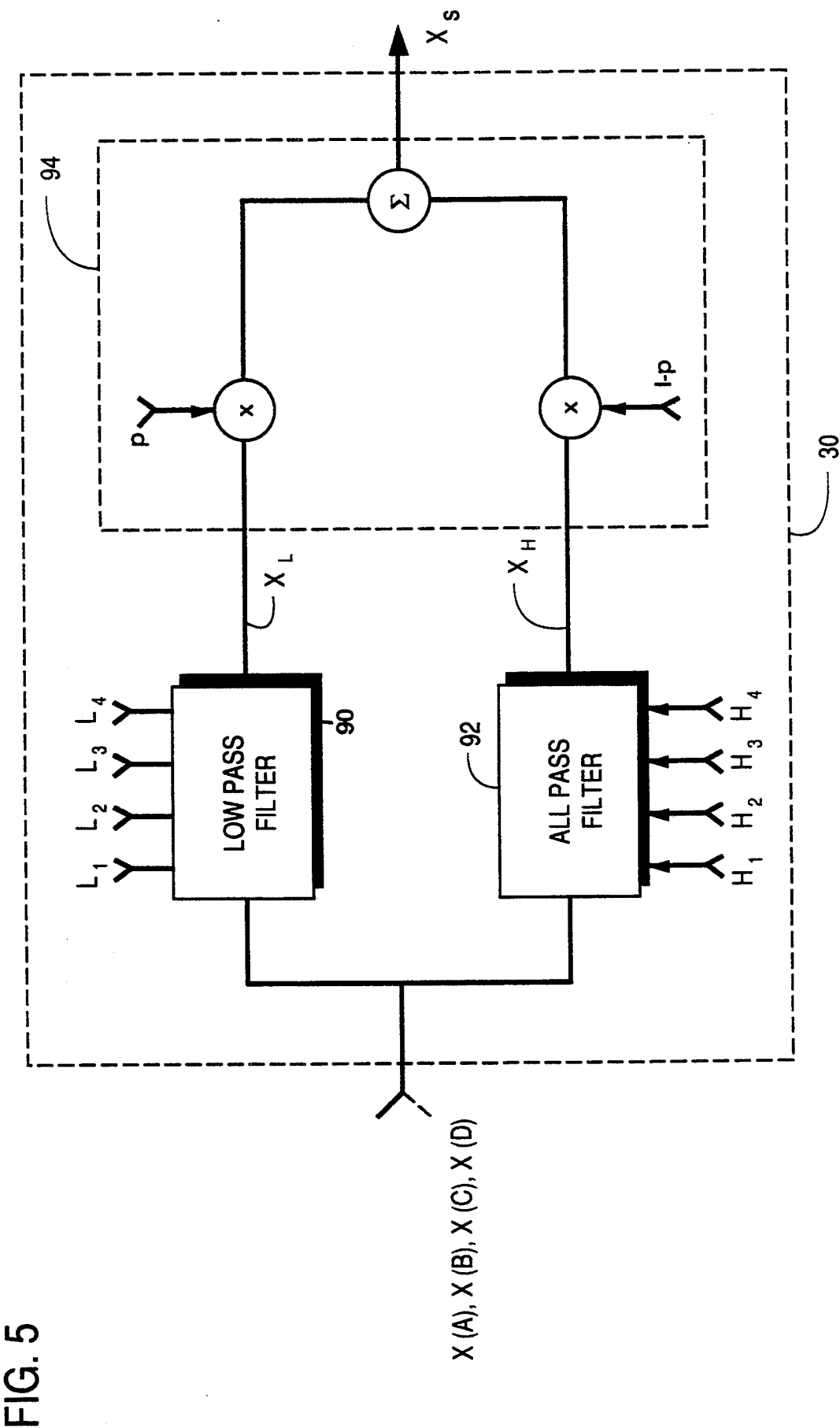
FIG. 5 is a block diagram of a seam filter.

Referring to FIG. 5, the four selected pixel values X(A), X(B), X(C), and X(D) (where the letters A–D identify the column A–D in which the selected pixel resides) are provided to a low pass filter 90 and to an all pass filter 92. The low pass filter computes a weighted sum $X_L$ of the four pixel values according to the following equation:

$$X_L = L_4 X(A) + L_3 X(B) + L_2 X(C) + L_1 X(D) \qquad (1)$$

where $L_1$, $L_2$, $L_3$ and $L_4$ are weighting coefficients to be described more fully below. Similarly, the all pass filter computes a different weighted sum $X_H$ according to the equation:

$$X_H = H_4 X(A) + H_3 X(B) + H_2 X(C) + H_1 X(D) \qquad (2)$$

where $H_1$, $H_2$, $H_3$, and $H_4$ are all pass filter coefficients described more fully below.

A combiner 94 combines the filter outputs according to the following equation to form the smoothed pixel value $X_s$:

$$X_s = pX_L + (1-p)X_H \qquad (3)$$

where p is a proportionality factor which determines the relative weight given to the outputs of the low and all pass filters.

Referring again to FIG. 4, the inner boundary pixel 70 which is adjacent pixel 72 is smoothed using the same selected set of pixel values X(A), X(B), X(C) and X(D) and the same proportionality factor p used to smooth pixel 72. However, as explained more fully below, the filter weighting coefficients $L_1$–$L_4$; and $H_1$–$H_4$ may have different values than those used to process outer boundary pixels, depending on the desired angle for smoothing.

II. Procedure for Determining the Characteristics of the Seam Filter

Figure 6:
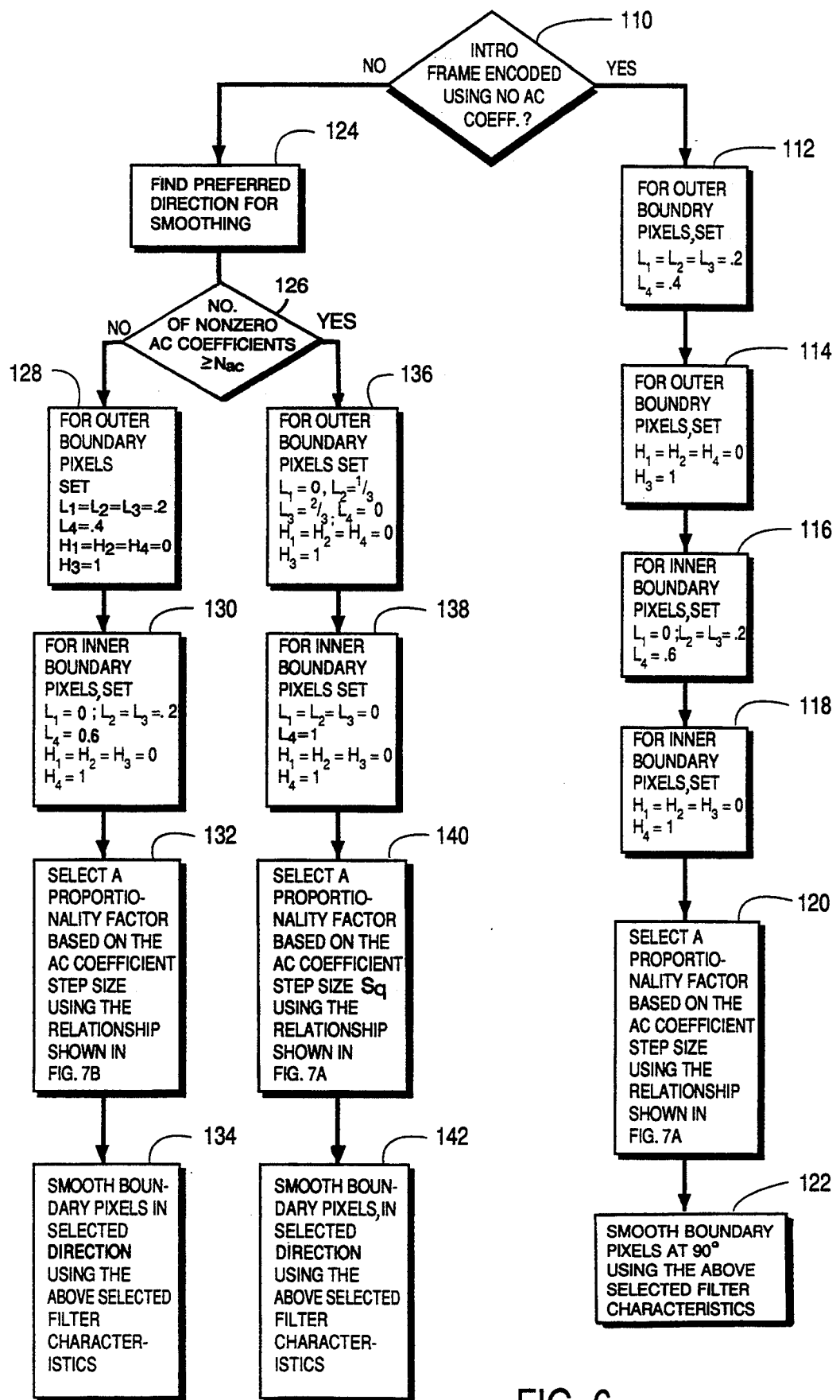
FIG. 6 is a flow chart illustrating the procedure for selecting characteristics of the seam filter.

Referring to FIG. 6, the following describes the procedure for determining the characteristics of the low pass filter, $L_1$, $L_2$, $L_3$, and $L_4$ and the characteristics of the all pass filter $H_1$, $H_2$, $H_3$, and $H_4$ used to process border pixels within block 40. The seam filter first determines if the received DCT coefficients for block 40 a) were intraframe encoded, and b) include any nonzero AC coefficients (Step 110). If the block was intraframe encoded using no AC coefficients, the seam filter sets the weighting coefficients for the low pass and all pass filters as follows. For filtering the outer boundary pixels, it sets the weighting coefficients L1, L2 and L3 of the low pass filter equal to 0.2 and sets the weighting coefficient L4 equal to 0.4 (Step 112). For the all pass filter, it sets the weighting coefficients H1, H2, and H4 equal to zero and the weighting coefficient H3 equal to one. (Step 114).

For filtering the inner boundary pixels, the seam filter sets the low pass filter coefficient $L_1$ equal to zero, L2 and L3 equal to 0.2, and $L_4$ equal to 0.6. (Step 116). For the all pass filter, it sets the weighting coefficients $H_1$, $H_2$, $H_3$ equal to zero and the coefficient $H_4$ equal to one. (Step 118).

The seam filter then determines the proportionality factor p according to the procedure described below (Step 120) and smooths all boundary pixels in a direction perpendicular to the boundary. (Step 122).

III. Procedure for Determining the Proportionality Factor

In the preferred implementation, the low pass filter performs substantial smoothing and the all pass filter performs no smoothing. Accordingly, if substantial smoothing is desired, proportionality factor p is set equal to one. If no smoothing is desired, proportionality factor is set equal to zero thereby disabling the low pass filter. If an intermediate degree of smoothing is desired, the proportionality factor is set between zero and one to select a desired degree of smoothing.

The magnitude of the proportionality factor p is determined based on the quantization step size used in quantizing AC coefficients corresponding to block 40. If the coefficients within block 40 are finely quantized, the seam filter 30 assumes that the received pixel values accurately represent the original image. Therefore little or no smoothing is performed. However, if the coefficients are coarsely quantized, seam filter 30 assumes that the pixels near the border 60 may include large pixel quantization errors. Accordingly, the seam filter performs substantial smoothing.

The preferred embodiment conforms to the CCITT H.261 standard, which permits thirty-one possible step sizes, comprised of the set of even integers {2, 4, 6, ... 62}. These step sizes $S_q$ must be applied to the intraframe DCT AC coefficients or to the interframe DCT DC and AC coefficients. The intraframe DCT DC coefficients use a different, predefined quantizer which is not material to the invention.

Figure 7A:
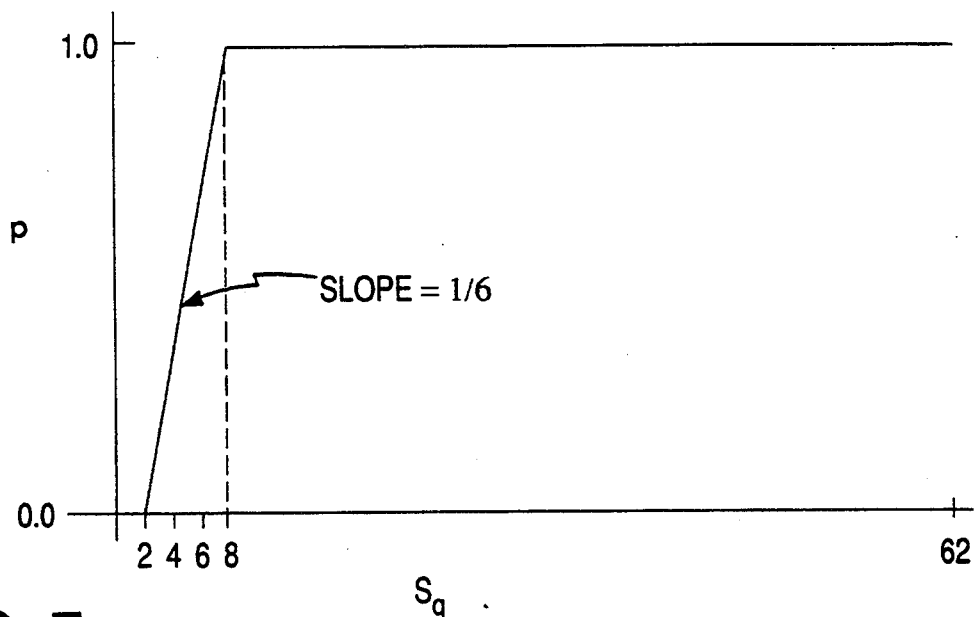
FIGS 7(a) and 7(b) are diagrams illustrating the relationship between a proportionality factor and a quantization step size.

FIG. 7(a) illustrates the value of the proportionality factor p for each of the thirty-one possible quantization step sizes used to encode the AC coefficients. For step sizes equal to or greater than eight, the proportionality factor is set equal to one thereby fully disabling the all pass filter and enabling the low pass filter. Thus, for step sizes equal to or greater than eight, seam filter 30 performs substantial smoothing.

A step size of two indicates that the transmitter essentially did not quantize the coefficients before sending them to the receiver except for rounding. The reconstructed pixels P'(i,j) for the block therefore are nearly identical to the original pixels P(i,j). Thus, for a step size of two, the proportionality factor is set equal to zero to disable the low pass filter thereby performing no smoothing.

For step sizes between two and eight, the proportionality factor gradually increases with step size as shown in FIG. 7(a) to gradually increase the degree of smoothing. More specifically, for these step sizes the ratio of the proportionality factor to step size is 1/6.

Referring again to FIG. 6, if the DCT coefficients within block 40 include at least one AC coefficient or if the block was interframe encoded, the seam filter proceeds to analyze the pixels within block 40 to determine the preferred direction in which to smooth the pixels. (Step 124). The filter selects a desired direction for each of the four borders surrounding the block.

After selecting the desired direction for each border, the seam filter compares the number of AC coefficients to a threshold $N_{ac}$ which, in the preferred embodiment, equals four. (Step 126). If the number of AC coefficients is less than the threshold, the seam filter sets the characteristics of the low pass and all pass filters to the same values described above. (Steps 112–118). It proceeds to select a proportionality factor based on the quantization step size used in quantizing the pixels. (Step 130). However, as explained more fully below, the proportionality factor p is selected in this case using different criteria.

Figure 7B:
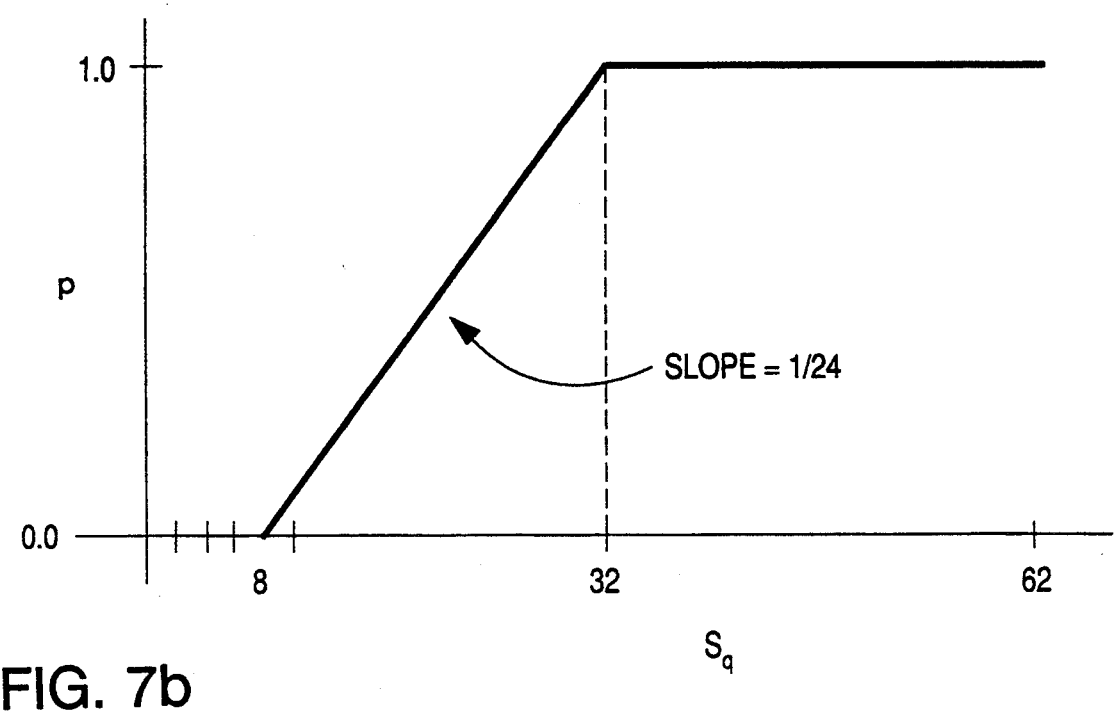

FIG. 7(b) illustrates, for this case, the value of the proportionality factor for each of the thirty-one possible quantization step sizes. For step sizes equal to or greater than 32, the proportionality factor is set equal to one thereby disabling the all pass filter and enabling the low pass filter. For step sizes between two and eight inclusive, the seam filter sets the proportionality factor equal to zero to disable the low pass filter and fully enable the all pass filter. For step sizes between eight and thirty-two, the proportionality factor gradually increases with step size as shown in FIG. 7(b) to gradually increase the degree of smoothing. More specifically, for these step sizes, the ratio of the proportionality factor to the step size is 1/24.

Referring again to FIG. 6, if the number of nonzero AC coefficients is greater than or equal to the threshold $N_{ac}$, the seam filter selects a different set of characteristics for the low and all pass filters. More specifically, to process the outer boundary pixels, the low pass filter weighting coefficients are set as follows: $L_1=0$, $L_2=\frac{1}{3}$, $L_3=\frac{2}{3}$, and $L_4=0$; and the weighting coefficients for the all pass filter are set as follows: $H_1=H_2=H_4=0$, and $H_3$ is set equal to one. (Step 136).

For processing the inner boundary pixels, the weighting coefficients of the low pass filter are set as follows: $L_1=L_2=L_3=0$, and $L_4=1$; and the weighting coefficients $H_1$, $H_2$, and $H_3$ for the all pass filter are set equal to 0 and the coefficient $H_4$ is set equal to one. (Step 138). The proportionality factor is then selected using the same criteria shown in FIG. 7(b). (Step 140).

Based on the selected weighting coefficients and proportionality factor, the border pixels for each of the four borders are filtered in the direction selected for the border. (Step 142).

IV. Selection of A Direction for Filtering Each Border

Figure 8A:
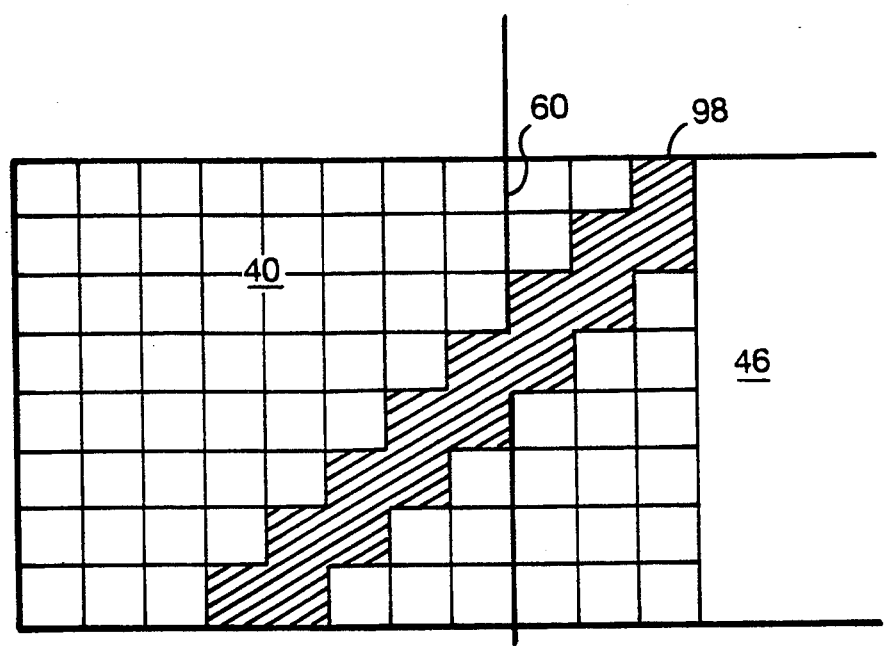
FIGS. 8(a) and 8(b) are diagrams illustrating an image line in the vicinity of a border between adjacent blocks.
Figure 8B:
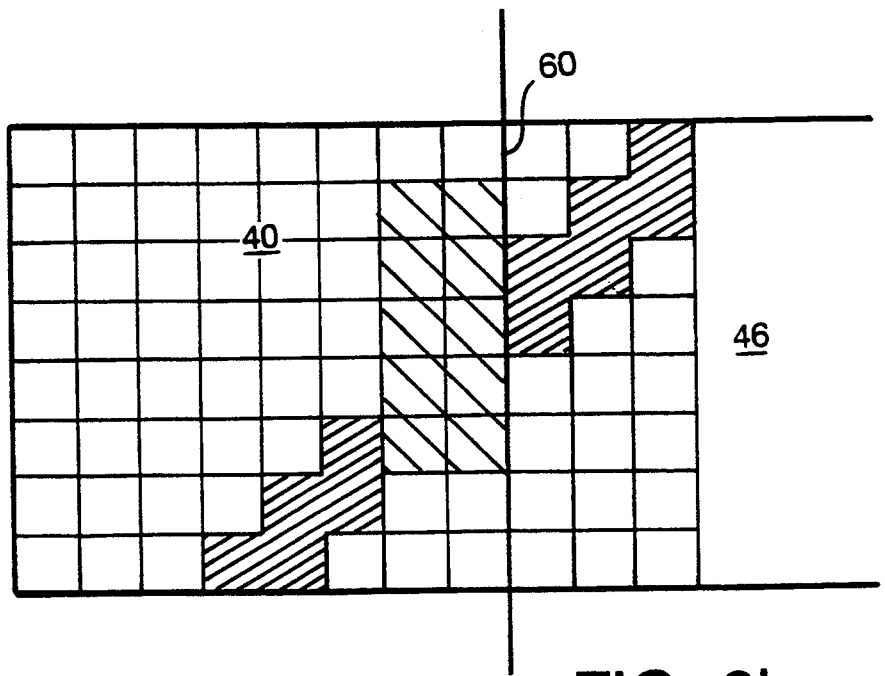

The original image 12 (FIG. 1) may include actual edges or lines within the vicinity of border 60. For example, FIG. 8(a) illustrates an image having a diagonal line 98 which crosses border 60 at approximately a 45° angle. As shown in FIG. 8(b), if the pixels within block 40 are smoothed in a direction perpendicular to the border, the seam filter will distort the diagonal line in its effort to smooth the block coding artifacts in the vicinity of border 60. More specifically, filter 30 lightens the pixels within the line 98 by averaging these pixels with lighter pixels from block 46. Similarly, it darkens light pixels from block 40 by averaging them with dark pixels from the portion of line 98 in adjacent block 46.

To eliminate this problem, seam filter 30 includes an edge detection mechanism for detecting legitimate lines or edges in the vicinity of the borders between adjacent blocks.

The following describes the operation of the edge detector in detecting edges in the vicinity of border 60. The same process is repeated for each of the four borders between block 40 and its neighboring blocks.

Figure 9A:
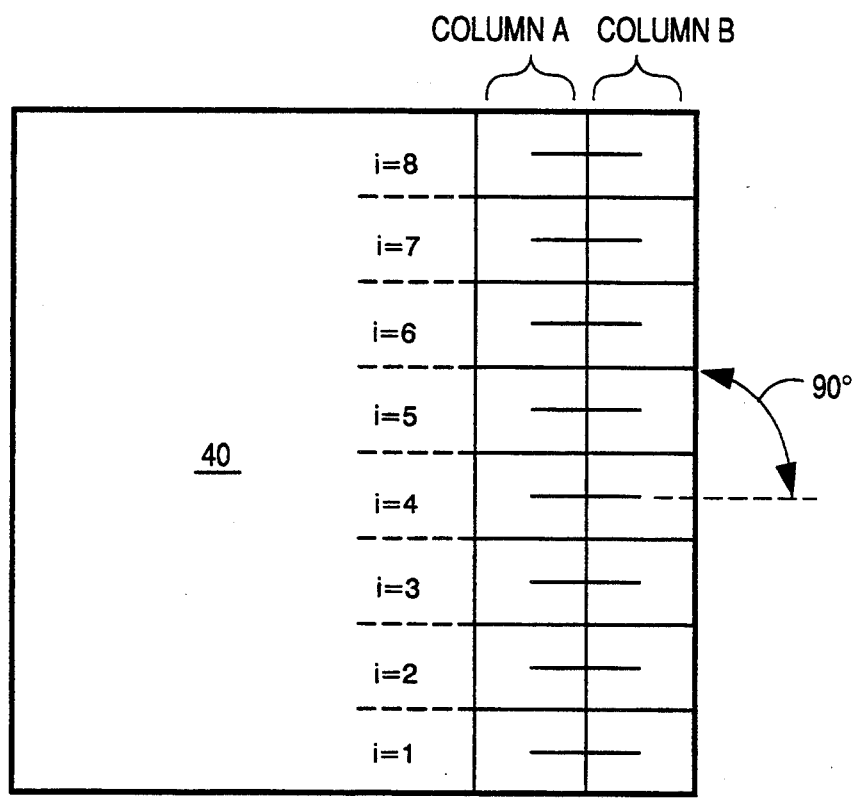
FIGS. 9(a)-9(c) are diagrams illustrating a pairing of pixels at 90°, 45° and 135° respectively
Figure 9B:
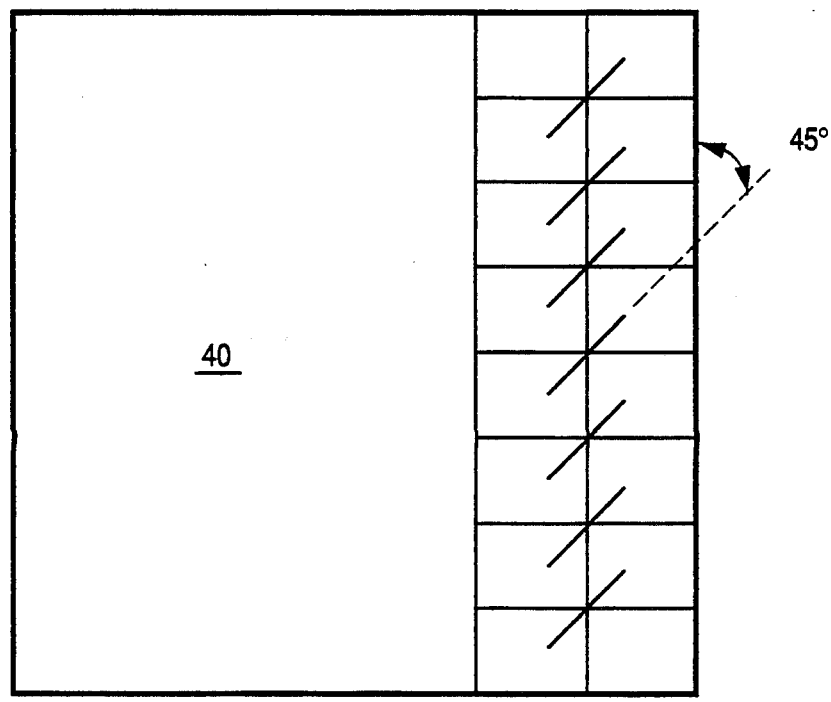
Figure 9C:
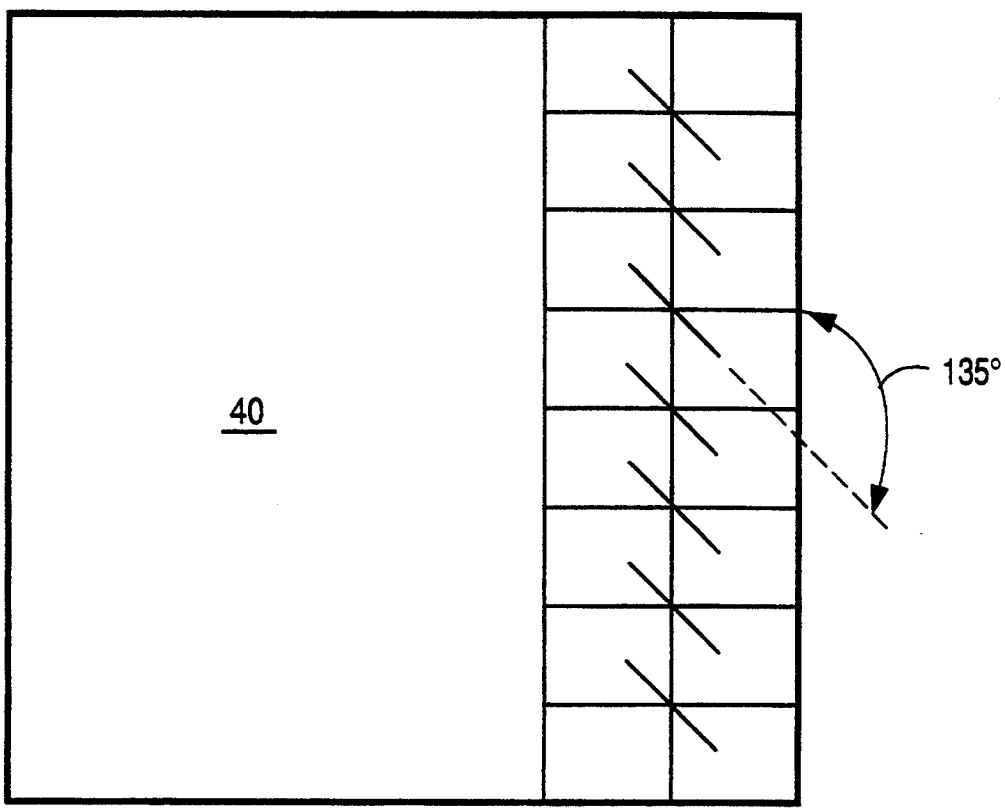

Referring to FIGS. 9(a)–9(c) block 40 includes two columns of pixels, A and B, which are adjacent to border 60. The edge detector computes a gradient from these pixels in each of the three directions, namely 45°, 90°, and 135°. To compute the gradient, the edge detector computes the average difference between adjacent pixels in columns A and B along each of the three directions. For example, to compute the gradient in the 90° direction, the edge detector computes the difference between each adjacent pair of pixels in columns A and B. (FIG. 9(a)). It then sums the differences and divides by eight according to the equation shown below:

$$G_{90} = \frac{1}{8} \sum_{i=1}^{8} |P_a(i) - P_b(i)| \quad (4)$$

where $P_a(i)$ represents a pixel from column A at row i, and $P_b(i)$ represents a pixel from column B at row i.

To compute the gradient in the 45° direction, the edge detector pairs a pixel from column A with a pixel from column B such that a line connecting the paired pixels forms a 45° angle with the border 60 as shown in FIG. 9(b). Block 40 includes seven such pairs. The edge detector then calculates the average difference between the seven pairs of pixels according to the equation below:

$$G_{45} = \frac{1}{7\sqrt{2}} \sum_{i=1}^{7} |P_a(i) - P_b(i+1)| \quad (5)$$

To calculate the gradient at a 135° angle, the edge detector pairs a pixel from column A with a pixel from column B such that the pair of pixels define a line intersecting border 60 at a 135° angle as shown in FIG. 9(b). Columns A and B include seven such pairs. The edge detector then computes the average difference between the seven pairs of pixels according to the equation below:

$$G_{135} = \frac{1}{7\sqrt{2}} \sum_{i=2}^{8} |P_a(i) - P_b(i-1)| \quad (6)$$

Based on the relative values of these gradients, the edge detector estimates the direction of any edges within the vicinity of border 60. A small gradient in a given direction indicates that the pixel values have similar values along that direction. Accordingly, this may suggest the presence of an edge along that direction.

Figure 10:
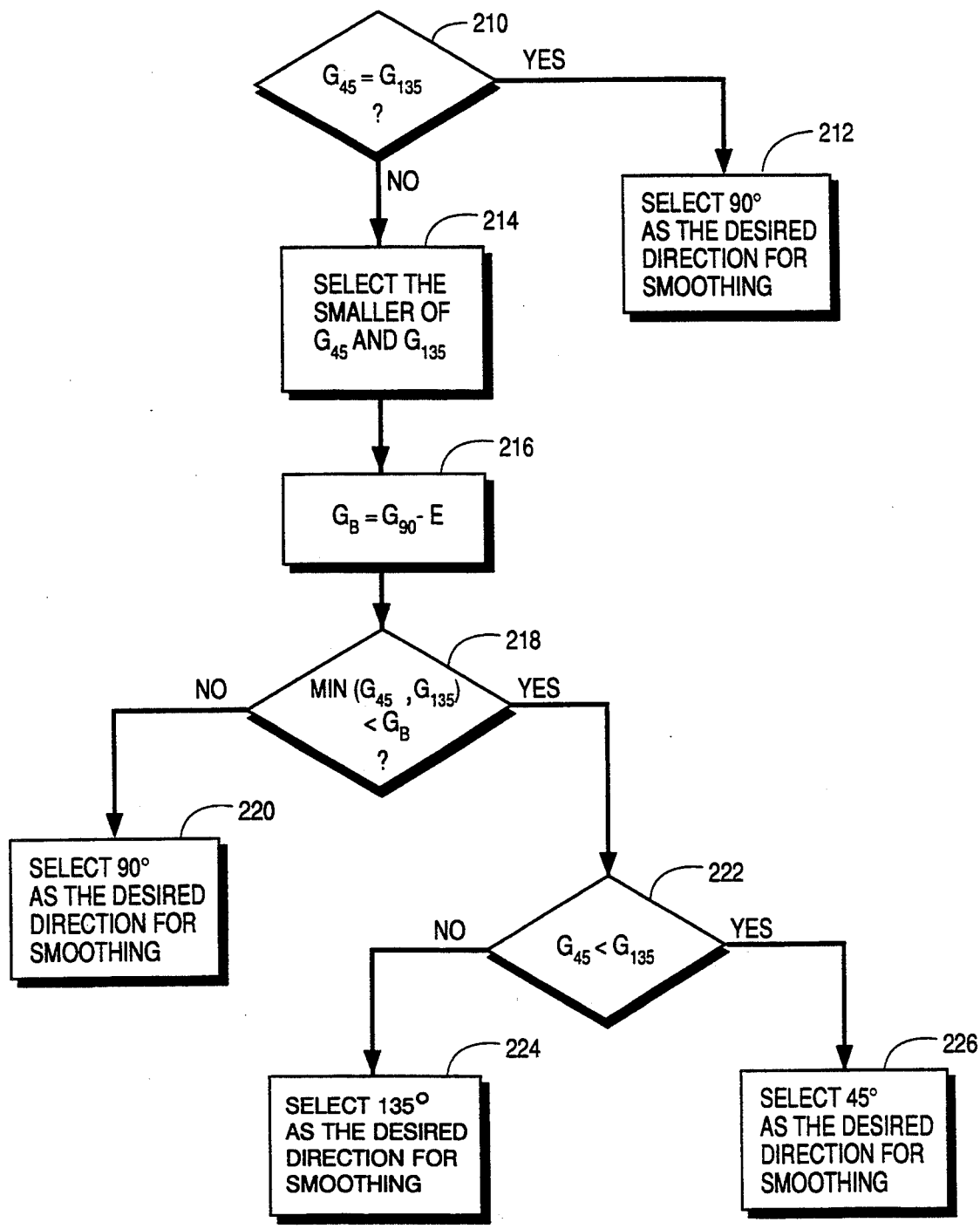
FIG. 10 is a flow chart of a procedure for selecting a direction for smoothing border pixels.

Referring to FIG. 10, the edge detector compares the gradient taken along the 45° angle $G_{45}$ with the gradient taken along the 135° angle $G_{135}$ (Step 210). If the two gradients are equal, the edge detector selects 90° as the desired direction for filtering (Step 212). If the gradients are not equal, the edge detector selects the smaller of the 45° gradient and the 135° gradient for comparison with the 90° gradient $G_{90}$. (Step 214). For purposes of this comparison, the edge detector subtracts from the 90° gradient a bias factor E (i.e., 2 in the preferred embodiment) to form a biased 90° gradient $G_B$. (Step 216). If neither of the 45° and 135° gradients is less than the 90° biased gradient, the edge detector selects 90° as the preferred direction for filtering. (Steps 218, 220). Otherwise, the edge detector selects the smaller of the 45° and 135° gradients. (Step 222). The angle at which this selected gradient was calculated is used as the preferred direction for filtering. (Steps 224, 226).

Additions, subtractions, deletions and other modifications of the preferred particular embodiments of the inventions will be apparent to those practiced in the art and are within the scope of the following claims.

What is claimed is:

1. A method for processing reconstructed, previously encoded block coded image data wherein each block comprises a plurality of pixels, said block collectively forming a reconstructed image, the method comprising the steps of:

selecting a local pixel from a first reconstructed block of pixels, said local pixel being near a border between said first block of pixels and a second reconstructed block of pixels, said second block being adjacent said first block, said local pixel having a first pixel value, selecting at least one external pixel from said second block of pixels, said external pixel having a second pixel value and being near said border, and modifying said selected local pixel to reduce the difference between said first pixel value of said local pixel and said second pixel value of said at least one external pixel while not modifying pixels of said first block more distant from said external pixel than said local pixel.

2. A method for processing block coded image data wherein each block comprises a plurality of pixels, the method comprising the steps of:

selecting a local pixel from a first block of pixels, said local pixel being near a border between said first block of pixels and a second block of pixels, selecting at least one external pixel from said second block of pixels, said external pixel being near said border, and modifying said selected local pixel to reduce the difference between said first pixel value of said local pixel and said at least one external pixel, wherein modifying said selected pixel value comprises the steps of:

selecting a low pass filter coefficient for each said selected local pixel value and for each said external pixel value, multiplying each said selected local pixel value and each said external pixel value by said corresponding selected low pass filter coefficient, summing the products of said multiplication step to form a low pass filtered pixel value, selecting an all pass filter coefficient for each said selected local pixel value and each said external pixel value, multiplying each said selected local pixel value and each said external pixel value by said corresponding selected all pass filter coefficient, summing the products of said multiplication step to form an all pass filtered pixel value, and combining said all pass filtered pixel value and said low pass filtered pixel value to form a smoothed pixel value.

3. The method of claim 2 wherein each said local pixel value is quantized with a quantization step size, and wherein combining said filtered pixel values comprises the steps of:

selecting a proportionality factor based on said quantization step size, computing a weighted sum of said all pass filtered pixel value and said low pass filtered pixel value to form a smoothed pixel value, wherein said proportionality factor specifies the relative weight accorded to each filtered pixel value.

4. The method of claim 3 wherein computing said weighted sum comprises the steps of:

multiplying said low pass filtered pixel value by said proportionality factor, multiplying said all pass filtered pixel value by one minus said proportionality factor, and summing the products of said multiplication steps to form said smoothed pixel value.

5. The method of claim 1 further comprising the step of:

detecting the approximate direction of edges, if any, in the vicinity of said border, and wherein selecting said at least one external pixel comprises the step of:

selecting at least one external pixel which forms a line with said local pixel such that said line extends in said detected direction.

6. A method for processing block coded image data wherein each block comprises a plurality of pixels, the method comprising the steps of:

selecting a local pixel from a first block of pixels, said local pixel being near a border between said first block of pixels and a second block of pixels, selecting at least one external pixel from said second block of pixels, said external pixel being near said border, and modifying said selected local pixel to reduce the difference between said first pixel value of said local pixel and said at least one external pixel, detecting the approximate direction of edges, if any, in the vicinity of said border, and wherein selecting said at least one external pixel comprises the step of:

selecting at least one external pixel which forms a line with said local pixel such that said line extends in said detected direction, wherein detecting said approximate direction comprises the step of:

computing a first gradient value representative of the average difference between at least one pair of local border pixels in the vicinity of said border such that said at least one pair of pixels defines a line in a first direction, computing a second gradient value representative of the average difference between at least one pair of local border pixels in the vicinity of said border such that said at least one pair of pixels defines a line in a second direction, and selecting said first direction as said detected approximate direction if said first gradient is less than said second gradient.

7. The method of claim 6 wherein said line in said first direction forms approximately a forty-five degree angle with said border, and wherein said line in said second direction forms approximately a one hundred and thirty-five degree angle with said border, and wherein said method further comprises the steps of:

computing a third gradient value representative of the average difference between a plurality of local border pixels in the vicinity of said border wherein each said pair of pixels defines a line in a third direction such that said line forms approximately a ninety degree angle with said border, subtracting a bias factor from said third gradient value to form a biased gradient value, and selecting said third direction as said detected approximate direction if said biased gradient is less than said first gradient and said second gradient.

* * * * *

UNITED STATES PATENT AND TRADEMARK OFFICE
CERTIFICATE OF CORRECTION

PATENT NO.    : 5,367,385

DATED         : November 22, 1994

INVENTOR(S)   : Xiancheng Yuan

It is certified that error appears in the above-identified patent and that said Letters Patent is hereby corrected as shown below:

Title Page, Column 2, third reference, change Shimada et al, to Shimoda et al.

Title Page, Column 2, third publication, delete "1966", insert --1986--.

Column 4, line 45, insert a space after "E(ij)" and before "into".

Signed and Sealed this

Fifth Day of May, 1998

Attest:

BRUCE LEHMAN

*Attesting Officer*  *Commissioner of Patents and Trademarks*